3,536,397
XEROGRAPHIC APPARATUS

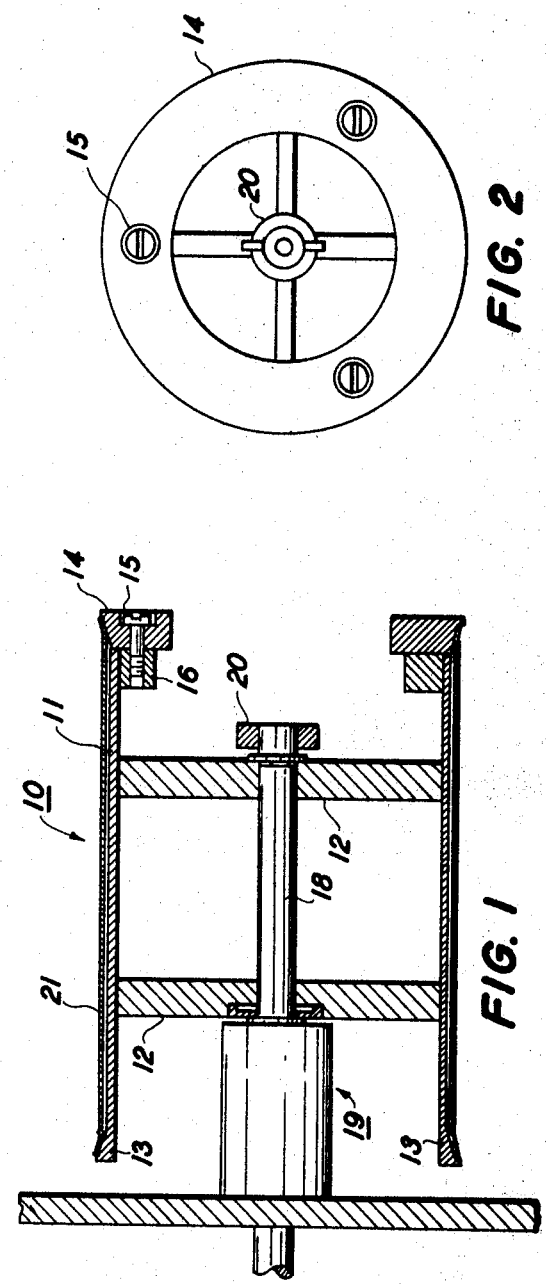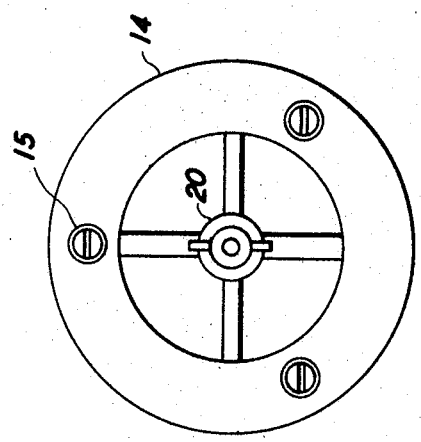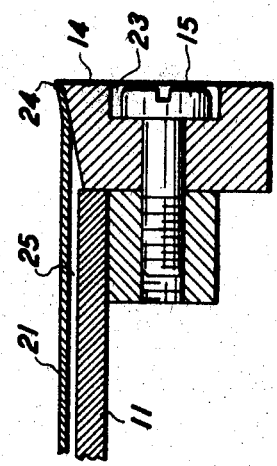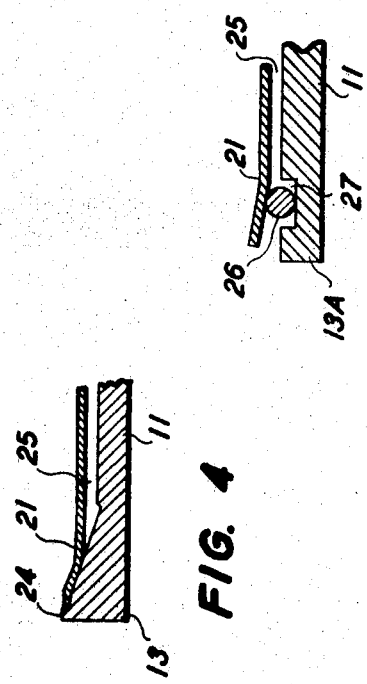

Edward M. Van Wagner, Webster, N.Y., assignor to Xerox Corporation, Rochester, N.Y., a corporation of New York
Filed Oct. 13, 1967, Ser. No. 675,253
Int. Cl. G03g 5/10
U.S. Cl. 355—3                                              7 Claims

ABSTRACT OF THE DISCLOSURE

Apparatus for supporting a flexible sleeve comprising a cylindrical support for said sleeve, said support comprising a concentric untapered central portion disposed between two end portions, at least one end portion being detachable from said support, contact means at each end portion adapted for fixedly holding a sleeve member in place, a flexible sleeve fixedly mounted over the outer peripheral surface of said support by physical contact with said contact means of each end, with the central working surface of said sleeve disposed between said contact means being free from physical contact with the central portion of said support.

BACKGROUND OF THE INVENTION

This invention relates in general to a xerographic drum, and in particular, to a new composite xerographic drum utilizing a cylindrical support member.

Xerographic plates generally known to the art comprise a thin wall cylindrical casting machined to proper precise tolerances, upon which is coated a photoconductive film such as vitreous selenium in a thickness up to about 100 microns. Although these cylindrical drums produce high quality images, and in general, may be reused for many cycles, their inevitable destruction eventually occurs during xerographic cycling from a combination of mechanical wear, heat, exposure to chemical solvents, scratches, etc., resulting in the replacement of the entire drum with a new one.

In order to obviate the high cost involved in replacing the entire drum described above, expandable mandrels or supports utilizing a disposable outer sleeve or belt having a photoconductive coating have been proposed. One example of such a sleeve comprises a brass substrate foil in the shape of an endless belt overcoated with a thin layer of photoconductive material. A typical example of an expansible mandrel used for such an application is disclosed in copending application Ser. No. 468,839, filed July 1, 1965. Mandrels of this type require a relatively large number of parts machined to close tolerances in order to insure a precise degree of concentricity. In normal use these mandrels may lose their concentricity by any one of the many internal parts being knocked or bent slightly out of alignment when the mandrel is removed from the drive shaft to replace the used photoconductive sleeve. If the concentricity is not kept within certain limits, nonuniform charging results in poor quality images being produced.

SUMMARY OF THE INVENTION

This invention involves a radical departure from the expansible type mandrels shown in the above copending application in that the mandrel or support cylinder of this invention is greatly simplified over that of the expanding mandrel type construction. In addition to the obvious reduction in cost, greater uniformity and closer tolerances may be achieved through the use of a nonexpandable mandrel of this invention in which tapered ends are machined to give a conical shape to both ends of the cylindrical mandrel, and allow the middle or central portion of the mandrel outer surface to be machined to a diameter slightly less than that of the smallest sleeve inner diameter that will be mounted upon it. The mounting of a sleeve and retention of its concentric position on the mandrel is based upon the elastic properties of the sleeve itself. The very ends of the sleeve are forced over the tapered ends of the mandrel and actually flared to assume the shape of the taper. The taper is calculated to prevent the sleeve material from being stretched beyond its elastic limit.

The xerographic plate of this invention comprises a photoconductive sleeve held a cylindrical support member and forms a composite xerographic drum which is generally used in the following manner: The drum is rotated through a series of stations beginning with a charging station at which a uniform electrostatic charge is deposited on the photoconductive layer. The drum is next rotated to an exposure station at which a light or radiation pattern of a copy to be reproduced is projected onto the plate surface which results in a dissipation of the charge in the exposed areas thereby forming a latent electrostatic image of the copy to be reproduced. The drum is then rotated to a developing station at which a xerographic developing material including toner particles having an electrostatic charge opposite to that of the electrostatic latent image are cascaded over the drum surface whereby the toner particles adhere to the electrostatic image to form a xerographic powder image in configuration of the copy to be reproduced. The drum is next rotated to a transfer station at which the xerographic toner image is electrostatically transferred from the drum surface to a transfer material or support surface such as a paper sheet. The drum is then rotated to a cleaning and discharge station at which the plate surface is brushed to remove residual toner particles remaining on the drum after the image transfer, and at which the drum surface is exposed to a relatively bright light source to effect a substantially complete discharge of any residual electrostatic charge remaining on the surface. This cycle is a typical image forming cycle to which drums of the instant invention may be applied, and is presented merely for a better understanding of the application of the drums of this invention.

It is, therefore, an object of this invention to provide a mandrel or support for a flexible photoconductive sleeve.

It is another object of this invention to provide a mandrel or support having a minimum of moving parts which can be easily assembled and disassembled in replacing a photoreceptor sleeve contained on its outside surface.

It is a further object of this invention to provide a cylindrical support for a photoreceptor sleeve in which the outer surface of the support comprises a substantially solid, rigid surface.

It is another object of this invention to provide a xerographic plate having a cylindrical support containing a photoconductive sleeve mounted on its outer surface.

DESCRIPTION OF THE DRAWINGS

For a better understanding of the invention, as well as further objects and features thereof, reference is had to the following and detailed description of the invention to be read in connection with the accompanying drawings wherein:

FIG. 1 illustrates schematically a cylindrical support mandrel for a photoconductive sleeve utilizing one embodiment of the subject invention;

FIG. 2 is an end view of one end of FIG. 1 to better illustrate the construction thereof;

FIG. 3 is an enlarged view of the removable end bell.

FIG. 4 is an enlarged view of the fixed end of the support mandrel.

FIG. 5 is an enlarged view of the fixed end of the support mandrel illustrating a second embodiment of the invention.

Referring to the drawings, there is shown in FIG. 1 a fixed support mandrel or cylinder 10 having an outer metal peripheral surface 11 supported by internal dual webs 12 with the surface 11 formed with a tapered fixed inboard end 13. A removable tapered end bell 14 is secured at the outboard end of cylinder 10 by screws 15 threaded into a circular flange 16. The cylinder is adapted to be used in any xerographic type copy machine by mounting through webs 12 on a shaft 18 which is journaled in a frame of a xerographic copy machine schematically designated as 19. The composite xerographic drum of this invention is adapted to be mounted on the horizontal drive shaft of said machine and rotated on said shaft when positioned in a drum drive casing. The free or outboard end of the drive shaft is normally threaded to receive a thumb nut 20 to secure the inboard hub of the xerographic drum into driven engagement to allow for rotation. A flexible photoconductive sleeve 21, to be described in more detail later, is mounted on mandrel 10 by contact with the tapered ends of the mandrel.

The drum of this invention is adapted for use in any xerographic type machine such as, for example, that illustrated in U.S. Pat. 3,301,126 (see in particular col. 6, lines 37–57 for a description of a typical operation of such a drum in a xerographic copy machine).

In FIG. 2 an end view of the removable end bell 14 is shown in which the three mounting screws 15 are located substantially equidistance around the outer bell end surface to secure it to fixed internal flange 16 of the mandrel in a manner to prohibit its rotation relative to the mandrel.

In FIG. 3 an enlarged view of the end bell is shown in which fastening screw 15 is shown in recess 23. It is noted that a shoulder 24 is formed at the end of the taper in order to hold the sleeve 21 in place when the shoulder screws are tightened down.

As illustrated in FIG. 4, which is an enlarged view of the fixed tapered section at the inboard end of the mandrel of FIG. 1, the photoconductive sleeve 21 is held in place, as in FIG. 3, by the angle of the taper and the shoulder 24 formed at the end of taper. In general, a taper of 3 to 5° for a distance of about ½ inch from the edge of the mandrel is sufficient to force fit the sleeve 21 in place when a drum or support member has a diameter of about 7 to 9 inches, and a length of about 8 to 15 inches.

In operation, the mandrel 10 is removed from the machine by sliding it off shaft 18 and placing the mandrel on a table with the removable end bell 14 up. The end bell is then removed by removing the three shoulder screws 15. After the end bell is completely removed, the old or used photoreceptor sleeve 21 is removed by slipping it off the mandrel 10, and a new photoconductive sleeve placed over the mandrel with its inboard end seated on the fixed end taper shown in FIG. 4. The middle section of the mandrel is machined to a radius approximately 0.15 to 0.25 inch below that of the smallest sleeve inner diameter that will be mounted on it. This results in a space 25 being formed between the outer diameter of surface 11, and the inner diameter of sleeve 21. This tolerance is applicable for the drum dimensions given above. The end bell is positioned in the open end of the sleeve to align the shoulder screws and holes. Tightening the shoulder screws in rotation forces the end bell uniformly into the sleeve with a slight expansion of the sleeve at the tapered end of the end bell. The sleeve also shares its travel up the fixed tapered end 13 due to the slight shoulder 21 at the end of the taper (see FIG. 4).

It should also be noted that in some instances it may be desirable to replace the photoconductive sleeve by leaving the support cylinder in place on the drive shaft 18, and removing the end bell and sliding the new sleeve horzontally onto the mandrel.

In an alternative embodiment of this invention, a compressible ring member is mounted at each end of the mandrel or support 10, with the ring member functioning as a substitute for the tapered end portions described above. One embodiment of this concept is illustrated in FIG. 5 where compressible O-ring 26, made of a resilient or expandable material such as rubber, plastic, metal, etc., is fitted over fixed end 13a, and contained in groove 27, machined around the periphery near the edge of fixed end 13a. The O-ring 26 is manufactured to an inside diameter slightly less than the diameter of the bottom flat surface of groove 27. The O-ring is placed in position in groove 27 by expanding it slightly and sliding it over fixed end 13a onto groove 27. The O-ring in position in groove 27 must have a compressible height slightly in excess of the outer diameter of photoconductive sleeve 21, in order to insure that the mounted flexible photoconductive sleeve does not contact the outer surface 11 of mandrel 10. A second O-ring is mounted at the movable end bell 14 in the same manner as described above for fixed end 13a.

In operation the O-rings function in substantially the same manner as described for mandrel 10 above when using the tapered ends. When the photoreceptor sleeve (removable end bell off) is slid over mandrel 10, and the end bell positioned over the open end of the sleeve, the tightening of shoulder screws forces the sleeve 21 to expand slightly over both O-rings resulting in a space 25 being formed between the outer diameter of surface 11, and the inner diameter of sleeve 21. As with the tapered ends, the sleeve 21 is supported at each end by a force fit over O-rings 26, which are slightly compressed when the sleeve is in place on mandrel 10.

It should be pointed out that whether a taper or compressible ring is used to support the ends of the photoreceptor belt, the dimensions of the ring and/or photoreceptor belt should be calculated so as to cause a force fit at the ends of the mandrel and with a force not to exceed the elastic limit of the photoreceptor sleeve mounted on either the taper or compressible rings. It can, therefore, be said that the various dimensions given in the specification are critical only so far as they are general guide lines as to suitable dimensions which can be used with materials such as plastics, brass, stainless steel, aluminum, nickel, and other similar materials.

Although the sleeve is suspended on tapered ends or a compressible ring member, and not solidly backed in its central portion (see FIGS. 2, 4, and 5), the photoconductive sleeve will not deflect or be depressed in normal xerographic machine usage inasmuch as very little pressure is normally placed on the photoconductive surface. If a developer or paper jam should occur, which would exert force or scratch the photoconductive coating, the sleeve will deflect to reduce pressure, and either clear the jam, or prevent the occurrence of severe scratches of a magnitude to cause replacement of the photoreceptor sleeve. Although there is no prevention for scratching, there is a tendency to reduce scratching by allowing the photoreceptor to yield beneath the scratching force. In this way, drum life will be extended.

Cleaning or pumicing the photoconductive surface of a xerographic drum with cleaners and solvents is normally carried out to restore xerographic properties of a used drum. Pumicing the photoreceptor of this invention can still be accomplished notwithstanding its novel configuration, inasmuch as the photoreceptor sleeve can only yield or be depressed several thousandths of an inch under extreme pressure before it rests against the backup metal of surface 11 in the center of the mandrel or support cylinder. This small amount of flexing does not crack or damage the sleeve. In an alternative embodiment of this invention, the fixed end taper (or with a compressible ring member) illustrated in FIGS. 1 and 4 may be replaced with a removable end bell such as illustrated in FIGS. 1, 2, and 3, resulting in a mandrel or support structure having two detachable end bells in which case either end of mandrel 10 may be slid onto shaft 18.

The photoreceptor sleeve 21, shown in FIGS. 3, 4, and 5, may comprise any metal base sleeve or foil such as brass, aluminum, copper, nickel, stainless steel, etc., overcoated with any suitable photoconductive material such as selenium, selenium alloys, other inorganic photoconductors, organic photoconductors, mixtures of various photoconductors, and various layered configurations having one or more photoconductive layers.

It may be noted that machine 19 illustrated schematically in FIG. 1 forms no part of the present invention. The support mandrel 10 and photoreceptor sleeve 21 of this invention may be fabricated in any size so as to be used in any xerographic type copy machine or for any analogous function of supporting endless cylindrical belts.

While the invention has been described with reference to the structures disclosed herein, it is not confined to the details set forth; and this application is intended to cover such modifications or changes as may come within the purpose of the improvements or the scope of the following claims.

What is claimed is:

1. A composite xerographic plate having cylindrical support means comprising a substantially concentric central working surface, said support means having two outwardly tapered ends, with at least one of said tapered ends being detachable, a cylindrical flexible sleeve member having a photoconductive coating at its outer surface fixedly mounted over the outer surface of said support means by physical contact with said tapered ends, with the central working surface of said sleeve disposed between said tapered ends being free from physical contact with the central portion of said support means.

2. The plate of claim 1 including stop means located at the outward end portions of each of the tapered ends, respectively, of said cylindrical support means.

3. The plate of claim 1 including internal means centrally located said cylindrical support, for affixing said composite xerographic plate to a drive shaft for rotation about its longitudinal axis.

4. A composite xerographic plate which comprises a cylindrical support means having at least one detachable end, a compressible ring member concentrically mounted on each end, a cylindrical flexible sleeve member having a photoconductive coating at its outer surface fixedly mounted over the outer surface of said support means by physical contact with said ring members, with the central working surface of said sleeve disposed between said tapered ends being free from physical contact with the central portion of said support means.

5. A composite xerographic plate which comprises a cylindrical mandrel having at least one detachable end, a compressible ring member mounted on the peripheral surface of each end, said compressible ring member having a compressible diameter in excess of the outside diameter of the peripheral surface of said cylindrical mandrel disposed between said ring members, and a flexible sleeve member having a photoconductive coating on its outer surface fixedly mounted in contact with said ring members.

6. The apparatus of claim 5 which further includes concentric groove means to contain said ring members, with said groove means located at each end, respectively, of the cylindrical mandrel.

7. A composite xerographic plate comprising a cylindrical support adapted to support a flexible sleeve containing a photoconductive coating thereon, said support comprising a concentric untapered central portion disposed between two end portions with at least one end portion being detachable from said support, contact means located at each end portion adapted for fixedly holding a sleeve member in place, and a flexible sleeve containing a photoconductive coating thereon fixedly mounted over the outer peripheral surface of said support by physical contact with said contact means of each end, with a central working surface of said sleeve, disposed between said contact means, being free from physical contact with the central portion of said support.

References Cited
UNITED STATES PATENTS

| 2,387,758 | 10/1945 | Jaros | 95—31 X |
| 2,624,652 | 1/1953 | Carlson | 355—17 X |
| 2,752,833 | 7/1956 | Jacob | 355—16 X |

JOHN M. HORAN, Primary Examiner

U.S. Cl. X.R.
95—31